United States Patent [19]
Pace

[11] Patent Number: 4,832,776
[45] Date of Patent: May 23, 1989

[54] PROCESS FOR APPLYING A PATCH

[75] Inventor: Vincent C. Pace, Redmond, Wash.

[73] Assignee: Formost Packaging Machines, Inc., Woodinville, Wash.

[21] Appl. No.: 147,833

[22] Filed: Jan. 25, 1988

Related U.S. Application Data

[60] Division of Ser. No. 939,590, Dec. 9, 1986, Pat. No. 4,735,674, which is a continuation-in-part of Ser. No. 715,568, Mar. 25, 1985, abandoned, which is a division of Ser. No. 440,898, Nov. 12, 1982.

[51] Int. Cl.⁴ .............................................. B32B 31/00
[52] U.S. Cl. .................................... 156/297; 156/256; 156/517; 156/519; 53/137; 53/138 R; 493/215
[58] Field of Search ............... 156/517, 519, 552, 497, 156/256, 230, 297, 516, 521, 539, 540, 541, 543, DIG. 38, DIG. 40, DIG. 42, DIG. 28; 53/137, 138 R; 493/215

[56] References Cited

U.S. PATENT DOCUMENTS

| | | | |
|---|---|---|---|
| 2,717,710 | 9/1955 | Baker et al. | 493/347 X |
| 3,250,659 | 5/1966 | Jackson | 156/519 |
| 3,431,827 | 3/1969 | Wahle et al. | 493/378 X |
| 3,553,933 | 1/1971 | Seko | 53/180 |
| 3,794,545 | 2/1974 | Lucas | 493/214 |
| 4,288,967 | 9/1981 | Seko et al. | 53/550 |
| 4,288,968 | 9/1981 | Seko et al. | 53/550 |
| 4,448,629 | 5/1984 | Malthouse | 156/517 X |
| 4,650,536 | 3/1987 | Ceraso | 156/517 X |

FOREIGN PATENT DOCUMENTS

| | | | |
|---|---|---|---|
| 694916 | 7/1953 | United Kingdom | 156/519 |

*Primary Examiner*—Caleb Weston
*Attorney, Agent, or Firm*—Robert W. Beach; Ward Brown

[57] ABSTRACT

Apparatus for making a plastic film bag having bag mouth lips projecting beyond a heat-seal band closing the bag mouth applies a stiffening patch bonded to the interior or exterior of a bag mouth lip between the heat-seal band and the bag mouth end for reclosing the bag mouth after the heat-seal band has been opened. For reclosing the bag mouth, the process applies stiffening patches to a web of sheet material for making bags at the time that the bags are formed and filled by clipping from a strip of patch-making material patch pieces having pressure-sensitive adhesive on one side. Apparatus performing the process transfers such patch pieces from a rotary shear onto the bag-making material by an orbiting transfer member having a suction pickup to pick up a patch piece and blowing means for subsequently detaching the patch piece from the transfer member and depositing it onto the web of bag-making material.

2 Claims, 10 Drawing Sheets

Fig. 8
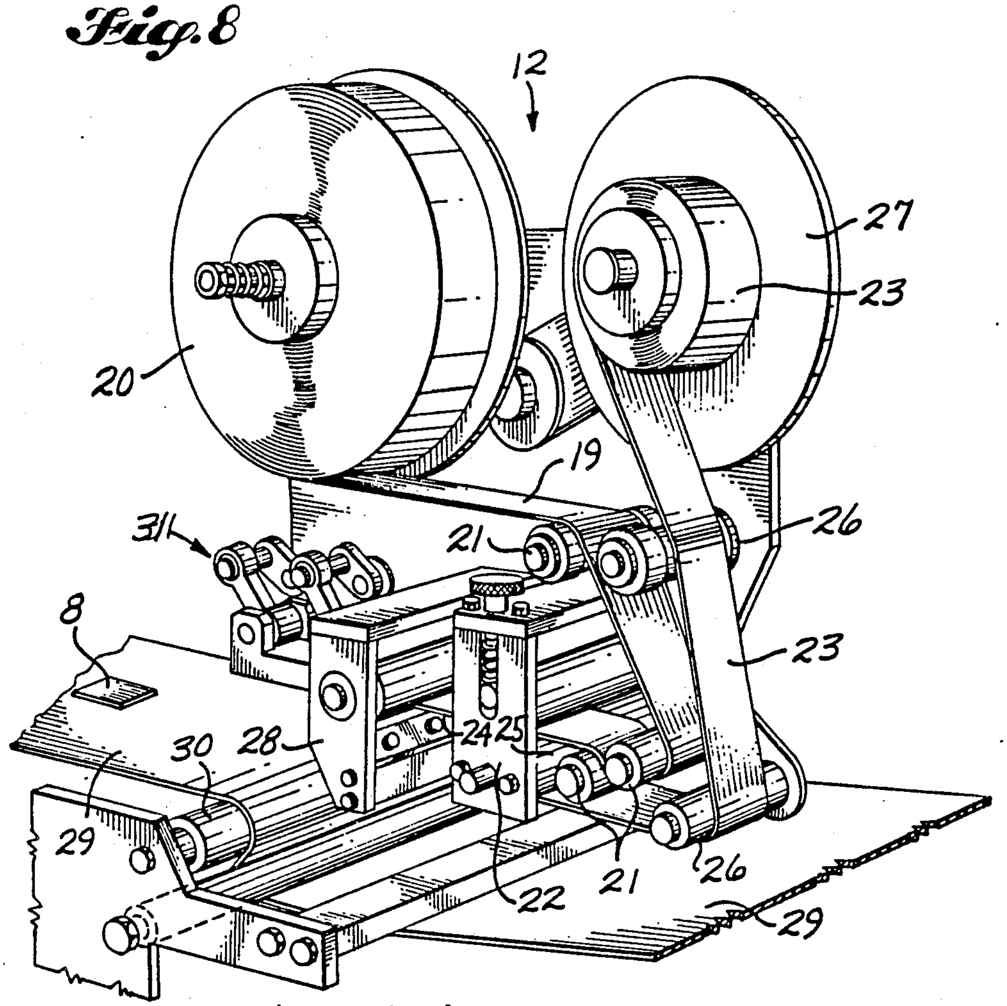
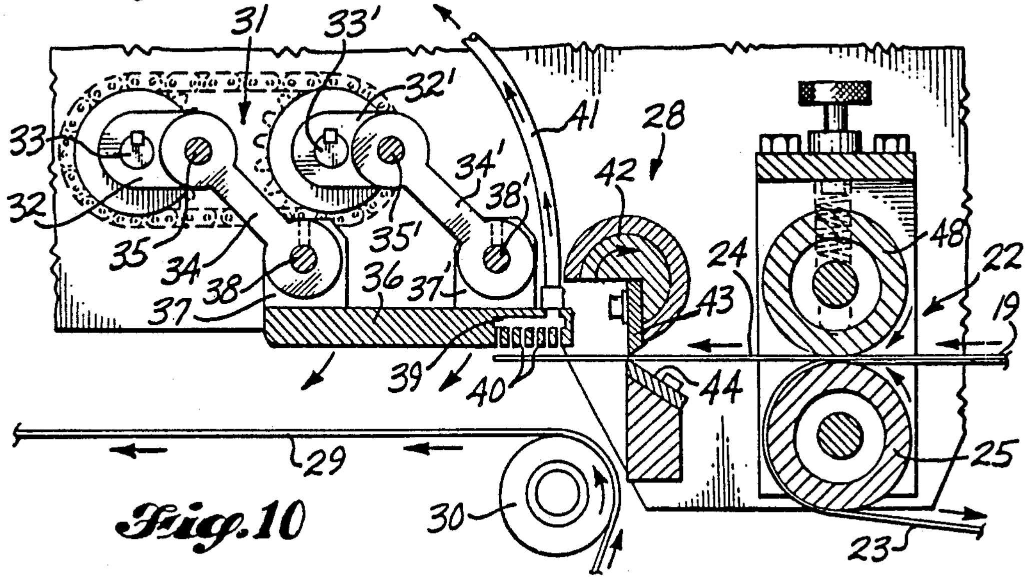
Fig. 10

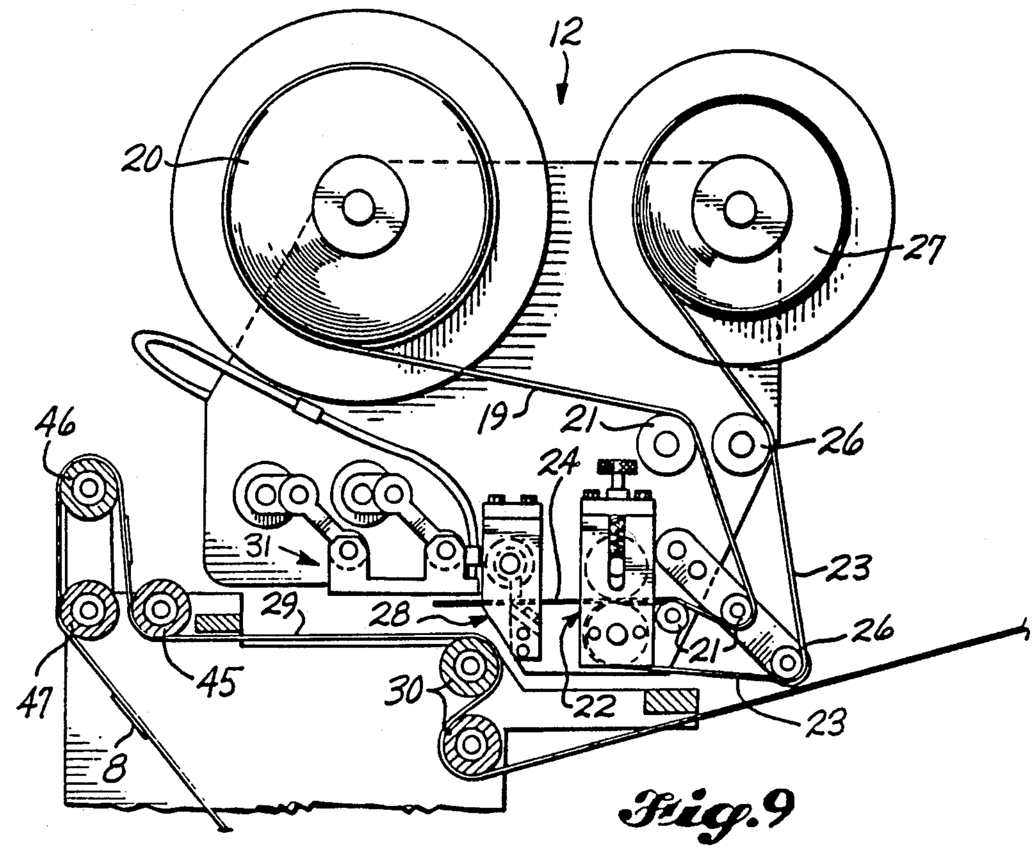
Fig. 9
Fig. 11
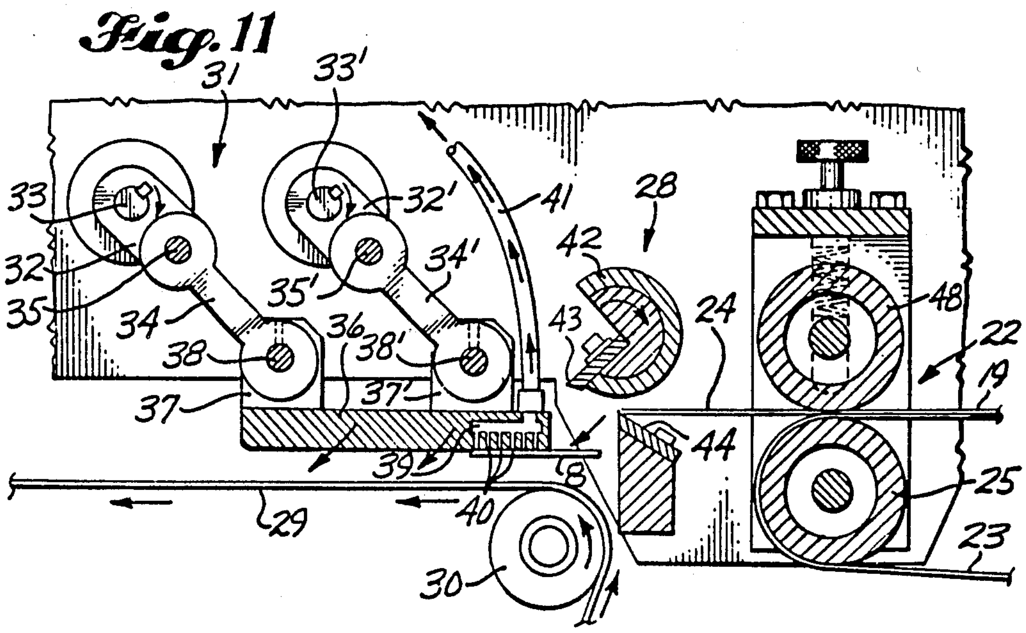

PROCESS FOR APPLYING A PATCH

CROSS REFERENCE

This application is a division of my U.S. application Ser. No. 939,590, filed Dec. 9, 1986, now U.S. Pat. No. 4,735,674, for Apparatus for Making a Bag with a Bag Mouth Closure and Process for Applying a Patch, which is a continuation-in-part of my application Ser. No. 715,568, filed Mar. 25, 1985, now abandoned, for Apparatus for Making a Bag with a Bag Mouth Closure, which was a division of my copending application Ser. No. 440,898, filed Nov. 12, 1982, for Bag Mouth Closure.

BACKGROUND OF THE INVENTION

1. Field of the Invention

This invention relates to a process for applying a piece to a sheet material web in making a bag of heat-sealable plastic film which has a mouth constructed to be heat-sealed initially and has a bag mouth closure including a patch bonded to the bag mouth and bendable in two return bends with the bag mouth lips for reclosing the bag mouth securely after the seal has been parted.

2. Prior Art

Apparatus for making heat-sealable bags of plastic film heat-sealable material are shown in U.S. Pat. Nos. 3,553,933 issued Jan. 12, 1971; 4,288,967 issued Sept. 15, 1981; and 4,288,968 issued Sept. 15, 1981. Such patents, however, do not show apparatus for applying a piece to a sheet for forming a reclosable closure for bags.

The apparatus of the present invention applies a patch piece to a web of plastic film heat-sealable material from which a bag is made. Apparatus for applying a piece to a web of wrapping material is shown in U.S. Pat. No. 3,431,827, issued Mar. 11, 1969, but that apparatus is rather complex and cumbersome and may not operate satisfactorily.

SUMMARY OF THE INVENTION

A principal object of the present invention is to apply a piece to a plastic film sheet for making bags provided with a reliable closure for the mouths of the bags so that they can be reclosed after even a small amount of the bag contents has been removed.

Another object is to provide an efficient, automatic process for applying a stiffener to a bag mouth during the bag-manufacturing process to form the bag closure.

The foregoing objects can be accomplished by a process for applying a stiffening patch or other sheet piece to a sheet web, such as of heat-sealable bag-making plastic material, at a location such that, when the bag is formed and its mouth is sealed by a heat-sealed band, such patch will be at the side of such band opposite the contents-holding body of the bag and between such sealed band and the open end of the bag mouth.

Also, such objects can be accomplished by a process which forms and applies the stiffening patch or other sheet piece to the sheet web in predetermined position while the web is moved continuously lengthwise without interruption.

BRIEF DESCRIPTION OF THE DRAWINGS

FIG. 8 is a top perspective of the portion of the apparatus for applying a stiffening patch to a bag-forming material web.

FIG. 9 is a side elevation of the component of the bag-making apparatus for applying a stiffening patch to the bag-making material web with parts shown in section.

FIGS. 10, 11 and 12 are enlarged side elevations of a portion of the component of the apparatus for applying a stiffening patch to bag-making material having parts broken away and showing parts in different operative positions.

DETAILED DESCRIPTION

Figure 1:
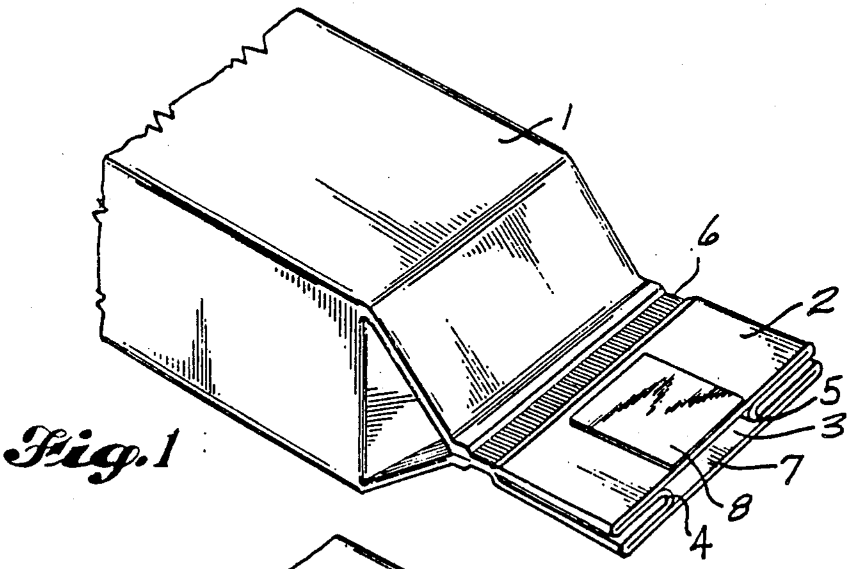
FIGS. 1, 2 and 3 are top perspectives of the mouth end portion of a bag showing a closure that can be made by the process of the present invention, part of the bag body being broken away in each instance.

The bag 1 can be made of flexible packaging sheet material, preferably heat-sealable polypropylene or polyethylene plastic material, which is customarily used for packaging products of various types, but is particularly used for packaging food products such, for example, as cookies or candy. Customarily only a portion, and sometimes only a very small portion, of the contents of a bag is removed when the bag is first opened, and it is often considered to be desirable to empty the entire contents of the bag into a jar or can or some other permanent type of container because the bag mouth cannot be reliably reclosed under such circumstances. It is important not only to provide a reliable bag mouth reclosure structure, but also one which can be made automatically by bag-making apparatus which is able to perform the process of the present invention.

The mouth of the plastic film bag shown in FIGS. 1, 2, 3 and 5 is formed by extended parallel planar principal lips 2 and 3, the opposite edges of which are joined by infolded sides 4 and 5. The band 6 bonding together the opposite projecting lips 2 and 3, preferably by heat-sealing, is spaced from the open end 7 of the bag mouth a distance sufficient to accommodate between such bonding band and the open end of the bag mouth a stiffener 8 of sufficient extent lengthwise of the bag to be folded in at least two return bends, as shown in FIG.

Figure 4:
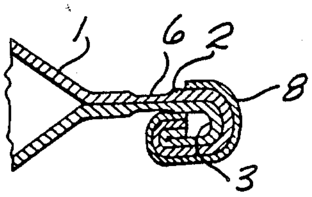
FIG. 4 is a detailed transverse section through the bag closure, the bag body being broken away.

4. The thicknesses of the bag material and of the stiffener are exaggerated in FIG. 4 for clarity of illustration.

The stiffener 8, shown in FIGS. 1 to 4 as being bonded to the exterior of bag lip 2, is a patch of material, preferably metal, which is deformable and substantially nonresilient so that when bent manually, or subsequently unbent, it will hold its bent shape or unbent shape, respectively. The stiffening patch is made of a sufficient width transversely of the bag, of a sufficient thickness and of material sufficiently malleable, but sufficiently resistant to deformation, so that the projecting bag mouth can be bent or rolled from the condition of FIG. 1 to the condition of FIGS. 3 and 4 and will reliably retain such bent or rolled condition. At the same time, however, the size, thickness and characteristics of the patch should be such that the bag mouth can easily be unfolded or unrolled again to the condition of FIG. 1 to enable the bag mouth to be opened for removal of additional contents even though creases may persist in the stiffener. Moreover, the material of the stiffening patch should be sufficiently resistant to fatigue that the bag mouth can be folded or rolled and subsequently unfolded or unrolled repeatedly without the stiffener breaking or cracking.

To provide a stiffener having such characteristics, it should be of substantial width transversely of the bag, such as at least about one-third of the transverse width of the bag lips 2 and 3, and preferably 2 or 3 inches (5 to 8 cm) in width. The stiffening patch should be of foil having a thickness of a few thousandths of an inch, preferably in the range of 0.001 to 0.004 of an inch (0.025 to 0.1 of a mm), the preferred thickness being 0.003 of an inch (0.075 of a mm). A material having suitable physical characteristics, i.e. deformable and substantially nonresilient, is substantially pure aluminum such as the aluminum alloy designated 11450.

The heat seal or other band 6 is of a character such that its components bonding the lips 2 and 3 of the bag mouth together can be parted rather easily without rupturing the bag material by simply pulling the lips 2 and 3 apart. To effect such a seal the heat-sealing temperature is within the range of 350° F. to 450° F. (177° to 250° C.) and not exceeding 550° F. (330° C.).

Bags of heat-sealed plastic sheet frequently have their heat-seal bands so close to the bag mouth open end 7 that it is difficult to grip the portions of the lips which are sealed that project beyond the heat-seal band to the bag mouth open end. Also, such heat seals are frequently so tight that it is difficult, if not impossible, to part the heat-seal components without rupturing the bag film. Under such circumstances it is often necessary to puncture, cut or tear the bag material at the side of the bonding band remote from the bag mouth end in which event the bag cannot be reclosed. Even if reclosure means were provided at the side of the heat-seal band remote from the bag mouth end, such reclosure means could not be used effectively unless a substantial amount of the bag contents were first removed if the bag initially were full.

In the bag closure made by apparatus of the present invention, one edge of the stiffening patch 8 is preferably located substantially flush with the bag mouth end 7. The extent of the stiffener lengthwise of the bag should be sufficient to enable the double return bend shown in FIGS. 3 and 4 to be formed with the stiffener extending around the outer periphery of the bend. By utilizing a stiffening patch of such extent lengthwise of the bag, the projection of the bag lips 2 and 3 beyond the bonding band 6 will be sufficient to enable a secure grip of the lips 2 and 3 to be exerted manually so that a firm separating pull can be exerted on the projecting lips to part the components of the seal 6 and open the bag mouth from the condition shown in FIG. 1 to that of FIG. 2. Whether or not any contents of the bag is removed, the bag mouth can be reclosed securely to the condition of FIGS. 3 and 4 by folding or rolling the bag lips 2 and 3 and the stiffener 8 in at least two return bends.

Figure 2:
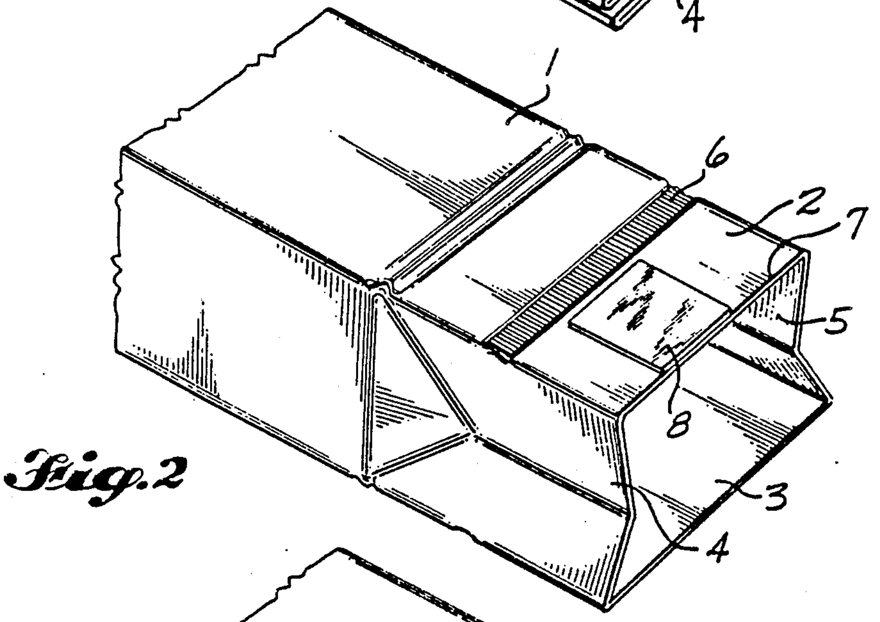
Figure 3:
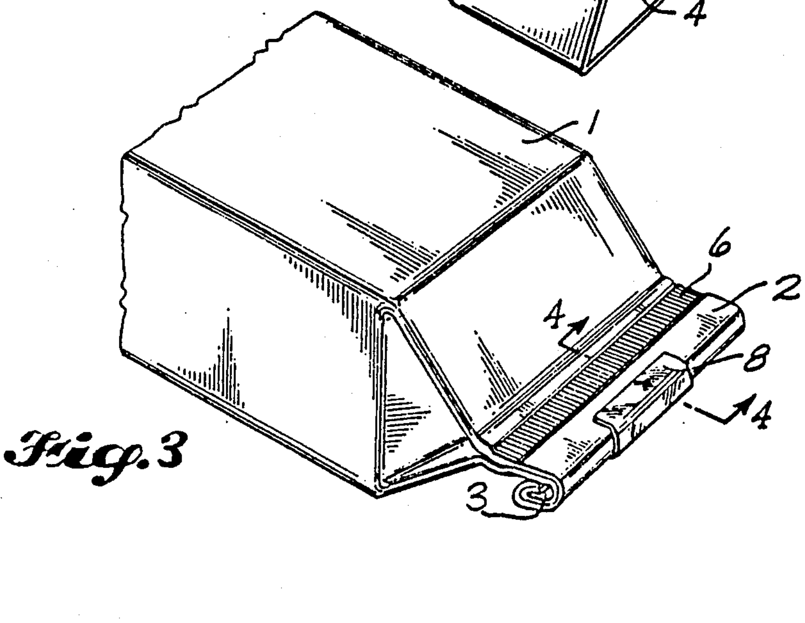
Figure 5:
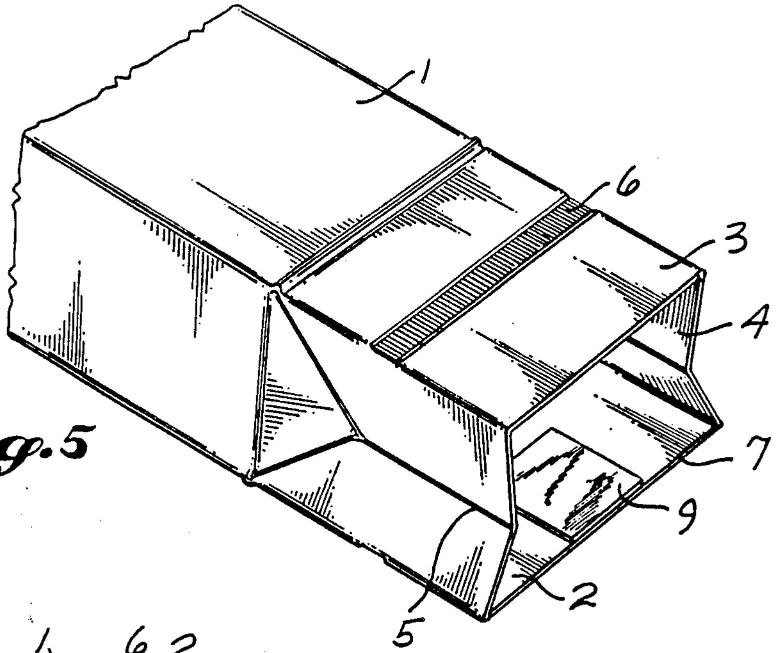
FIG. 5 is a top perspective of the mouth end of a bag corresponding to FIGS. 1, 2 and 3 but showing an alternative type of bag mouth closure.

In FIGS. 1, 2 and 3 the stiffener 8 is shown as being bonded, such as by pressure-sensitive adhesive, to the exterior of the lip 2. In FIG. 5, the stiffener 9 is shown as being bonded to the inner face of the lip 2 instead of to its outer face, again with one edge being substantially flush with the bag mouth end 7. The stiffening patch 9 of FIG. 5 preferably is of approximately the same size, shape and material as the stiffening patch 8 shown in FIGS. 1, 2 and 3. Moreover, the location of the stiffening patch of FIG. 5 will be approximately the same as the location of the stiffening patch shown in FIGS. 1, 2 and 3 except for being bonded to the inside of the bag lip 2 instead of to the outside of such lip. Also, the heat seal band 6 in the bag of FIG. 5 will be spaced from the bag mouth end 7 substantially the same distance as the spacing between the heat seal band 6 and the bag mouth end in the closure of FIGS. 1, 2 and 3.

Figure 6:
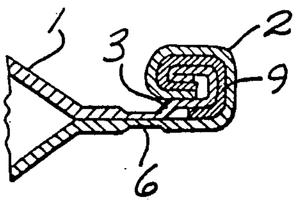
FIG. 6 is a detailed transverse section through the closure portion of the bag corresponding to FIG. 4 but showing the bag closure structure of FIG. 5.

When the bag mouth is closed by the seal band 6, the lips 2 and 3 will be held sufficiently close together as to substantially conceal the stiffening patch 9. After the bag has been opened, however, such stiffener will enable the bag mouth to be reclosed by folding or rolling the principal bag lips 2 and 3 with the stiffener between them in the manner shown in FIG. 6. In this instance, the stiffening patch will effect a reliable closure of the bag mouth even though it is on the inside of the lip 2, as shown in FIG. 6, because it is bonded to such lip and is positioned exteriorly of the opposite lip 3 which is on the inner side of the fold or roll.

Figure 7:
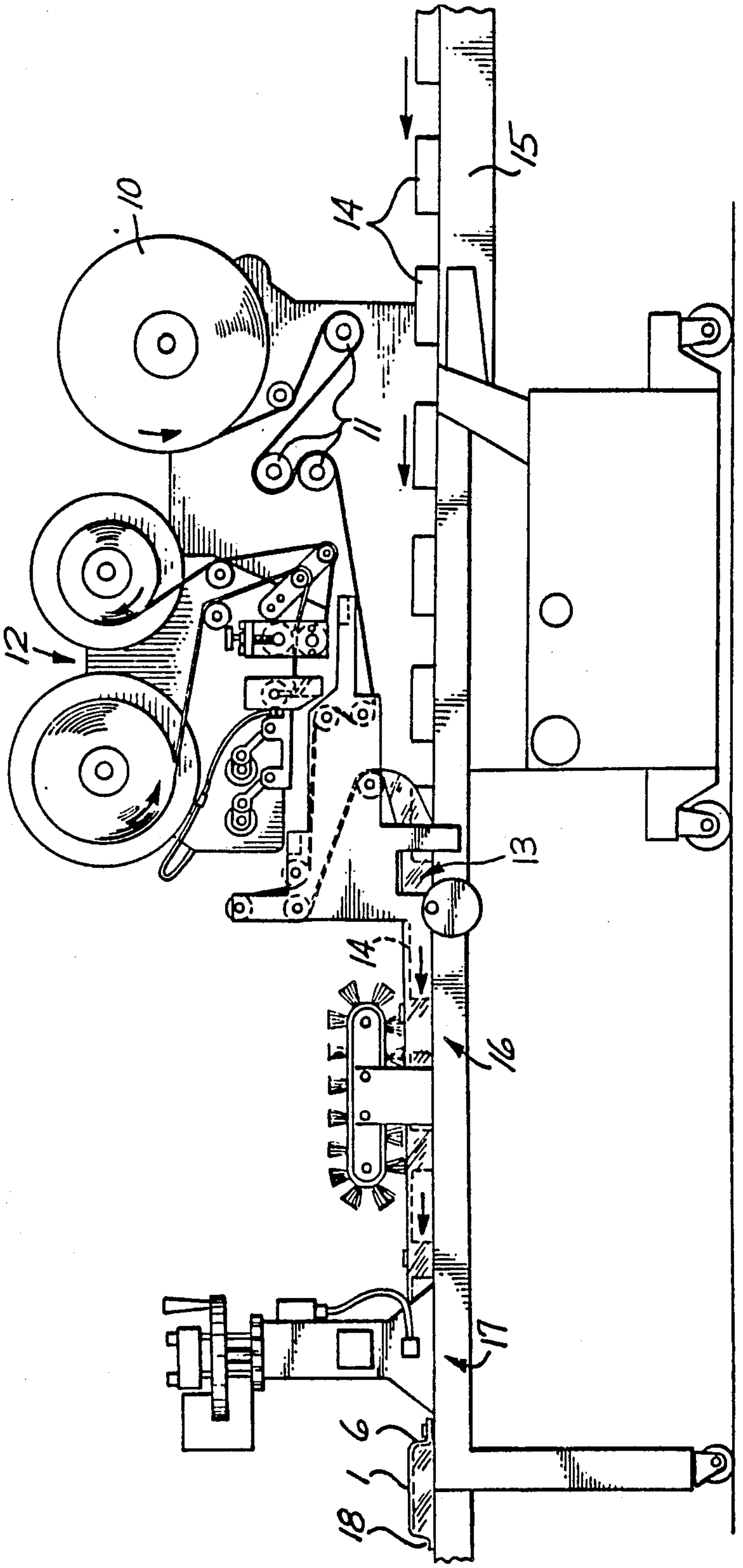
FIG. 7 is a side elevation of apparatus for making and filling bags the present invention for making and filling bags, which apparatus is shown somewhat diagrammatically.

Apparatus for applying the stiffening patch 8 of FIGS. 1, 2 and 3, or the stiffening patch 9 of FIG. 5, to the bag-making material web during the bag-making process is shown in FIGS. 7 to 12. FIG. 7 shows the overall bag-forming and filling apparatus, while FIGS. 8 to 12 show in greater detail the patch-applying apparatus. In general, the bag-making heat-sealable plastic film is supplied in a roll 10 from which a sheet web is dispensed as necessary around guide and smoothing rolls 11. The bag-making sheet material web then passes through the component 12 for applying the stiffening patch 8 or 9 and on through the bag tube-forming component 13. Product 14 to be bagged is transported by conveyor 15 to the tube-forming station 13 and a longitudinal seam of the bag is completed at station 16. From there the bag is moved to the heat-sealing station 17 where a strong heat seal 18 is made to seal the bottom of the bag 1 and a comparatively weak heat seal band 6 is provided to seal the mouth of the bag, as described in connection with FIGS. 1 to 6.

The stiffening patches 8 or 9 are applied to the bag-making material web by the component 12 of the apparatus as shown in greater detail in FIGS. 9 to 12, inclusive. The patches are cut from a continuous composite strip 19 of material supplied from a roll 20 of such material. Such composite strip includes a strip of aluminum foil having pressure-sensitive adhesive on one side, which side is covered by a protective backing strip or liner 23. From the supply roll 20, the composite strip passes around guide rollers 21 to the liner stripper 22. Such stripper strips the lining strip 23 from the patch-making strip 24 and the liner passes around the stripping roll 25 and guide rollers 26 to be wound on storage spool 27. The patch-making strip proceeds to the rotary shear 28 which cuts patches to length for transfer to the bag-making sheet material web 29 which is guided to the patch-applying station by guide rollers 30.

Figure 12:
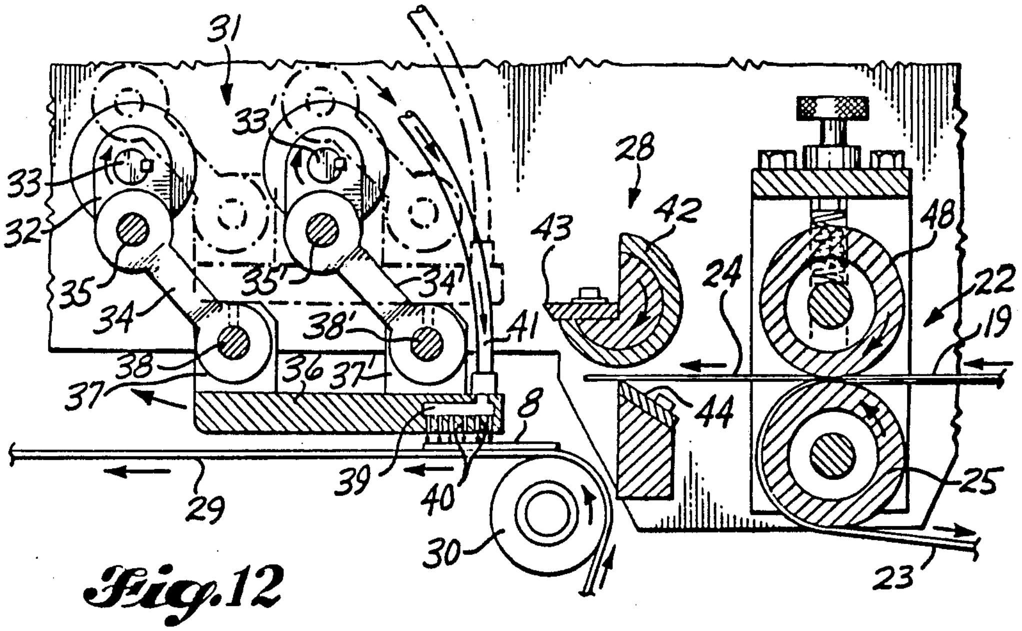

The patch piece transfer mechanism 31, shown best in FIGS. 9 to 12, includes twin cranks 32 and 32' mounted on and keyed to spaced parallel shafts 33 and 33', respectively, for unidirectional conjoint rotation, clockwise as seen in FIGS. 10, 11 and 12, by rotation of such shafts by chain and sprocket mechanism shown somewhat diagrammatically in FIG. 10. The orbiting ends of such cranks carry parallel arms 34 and 34', respectively, corresponding ends of which are journaled on pivot pins 35 and 35' carried by such crank ends, respectively.

A spreader bar 36 forming a patch piece transfer member has posts 37 and 37' upstanding from its opposite ends that carry fixed pins 38 and 38' integral with and projecting from corresponding sides of such posts. Corresponding ends of the parallel arms 34 and 34' are fixed by set screws to the pins 38 and 38', respectively, as indicated in broken lines in FIGS. 10, 11 and 12. Consequently, as the crank arms 32 and 32' rotate clockwise from their positions of FIG. 10 through their positions of FIG. 11 and their solid line and broken line positions of FIG. 12, the spreader bar 36 will be revolved unidirectionally clockwise correspondingly through an orbit while maintaining an attitude always parallel to the plane of the sheet-forming film 29 beneath it.

The cranks 32 and 32' are offset lengthwise of the direction of movement of web 29 from the cutter 28, and the parallel arms 34 and 34' carrying the transfer member 36 are inclined relative to the web 29 away from the crank ends 35 and 35' and toward the cutter 28. As the cranks 32 and 32' are revolved, the transfer member 36 is moved in an orbit having one portion disposed closest to the cutter 28 when the cranks are in the horizontal position shown in FIG. 10. The transfer member is moved in such orbit through the position of FIG. 11 when the cranks are inclined downward 45 degrees to the patch-depositing position shown in FIG. 12 in which the cranks are vertical and the transfer member is closest to the web 29. As the cranks 32 and 32' continue to rotate, the transfer member is moved in its orbit from such patch-depositing position farther from the cutter 28 and away from the web before the transfer member is returned to the position of closest approach to the cutter shown in FIG. 10.

One end of the spreader bar or patch piece transfer member 36 has in it a chamber 39 with which the inner ends of small air passages 40 extending through the bottom of the member 36 communicate. An air hose 41 is connected to such spreader bar and is in communication with its chamber 39.

The shear 28 includes a rotor 42 carrying a rotating blade 43 which cooperates with the stationary anvil 44 to clip successive patch pieces 8 from the strip 24 of patch-making material. The rotation of the rotor 42 in the clockwise direction as seen in FIG. 12 is coordinated with the rotation of the shafts 33 and 33' carrying crank arm 32 and 32' so that each patch piece 8 is cut from the patch-making strip 24 when the spreader bar 36 is in the predetermined position shown in FIG. 10.

When the spreader or patch piece transfer member 36 is in the position of FIG. 10, air will be withdrawn through the hose 41 from the chamber 39 and passages 40 so that suction will occur beneath the end of the spreader adjacent to shear 28 in the vicinity of the apertures providing entrances to the passages 40. As the spreader bar descends from the position shown in FIG. 10, its suction end will engage and grip the projecting end of the strip 24 at or immediately following the instant that blade 43 clips off such projecting end portion to form a patch piece. Such severed patch piece will be gripped by the suction of the spreader bar 36 so that the spreader bar carries the patch piece downward into a position in proximity to the bag-making sheet web 29, as shown in FIG. 12. In that position of the spreader bar, the suction applied to hose 41 is discontinued and through that hose air is supplied to the spreader bar chamber 39 and the apertures 40 to blow the patch piece 8 from the transfer member down onto the bag-making web 29. The patch piece will be stuck to the web 29 more or less tightly by the pressure-sensitive adhesive on the patch piece.

From the patch-applying station 31, the bag-making material web 29 is moved beneath roller 45 shown in FIG. 9 and then around upper roller 46 and lower roller 47 to the bag-forming station 13 shown in FIG. 7. Passage of the patch 8 in contact with the roller 45 will iron the patch onto the web to set the pressure-sensitive adhesive so that the patch will be bonded firmly to the web.

The stripping roller 25, its cooperating pressure roller 48, the shear 28, the crank shafts 33 and 33', the product supply conveyor 15, the tube-forming mechanism 13 and 16 and the heat-sealer 17 are coordinated in their operation so that the patch piece 8 will be cut off and applied to the bag-making web at the proper time for it to be positioned accurately on the completed bag in the position discussed in connection with FIGS. 1, 3 and 5.

In order to expedite production it is desirable to be able to apply the patch piece 8 to a rapidly moving web 29. U.S. Pat. No. 3,431,827, disclosing apparatus for applying a piece to a moving web, states at column 2, lines 58 to 61 that, when the cutter is applying the piece to the web, such cutter preferably travels at the exact speed of the wrapping material. If the speeds are not thus coordinated, the piece being applied and the web could have relative movement lengthwise of the web, which could make it difficult to apply the piece properly where the piece is to be pressed mechanically or positively into place on the web at the time it is applied. In the operation of the apparatus shown in FIGS. 10, 11 and 12, the patch piece 8 is not pressed onto the web by the transfer member 36 but instead is blown from the transfer member onto the web, as shown in FIG. 12, so that there is no simultaneous contact of both the transfer member 36 and the web 29 with the patch piece. Stated in another way, the patch piece floats from the transfer member 36 to the web 29.

Figure 13:
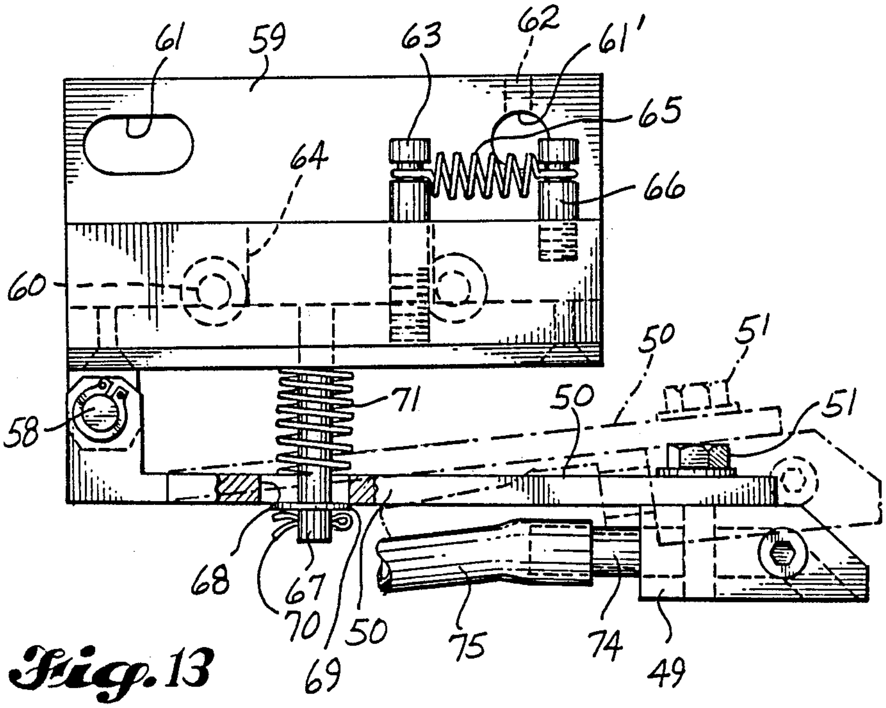
FIG. 13 is a side elevation of an alternative form of patch piece applying component that can be substituted for the component shown in FIGS. 10, 11 and 12.
Figure 17:
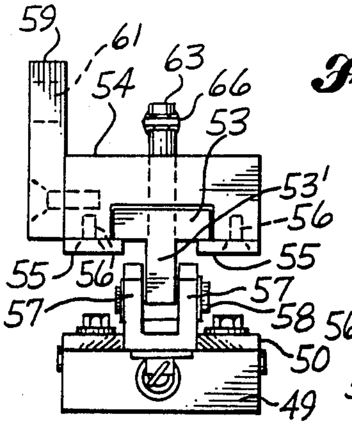
FIG. 17 is an elevation of the other end of the patch piece applying component of FIG. 13.
Figure 18:
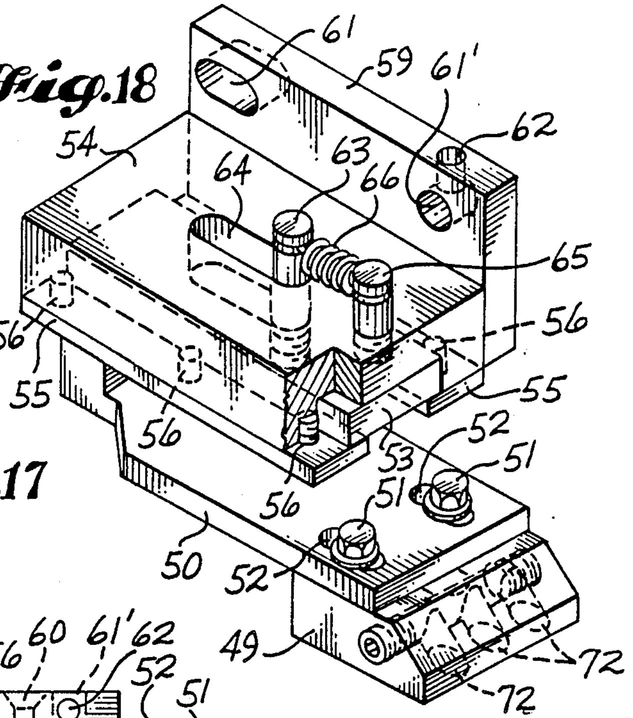
FIG. 18 is a top perspective of such alternate type of component with a part broken away.
Figure 14:
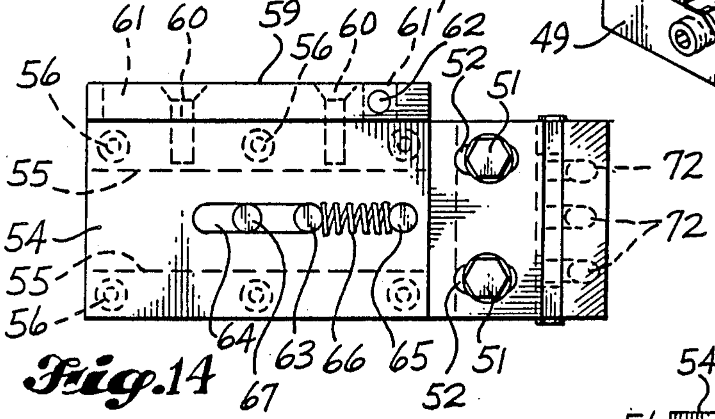
FIG. 14 is a top plan.

If it is desired to have a positive and controlled application of the patch piece 8 onto the web 29, the alternative type of patch-applying component shown in FIGS. 13 to 23 can be used. In this mechanism, the patch piece transfer member 49 is attached to a plate 50 by bolts 51 extending through apertures 52 in the plate 50, which preferably are slots, as shown in FIGS. 14 and 18, so that the patch piece transfer member can be adjusted to some extent lengthwise of the plate 50.

The plate 50 is suspended by its end remote from the patch piece transfer member from a slide 53 received in a guide groove in the bottom of a mounting block 54. The slide is supported by marginal retainer plates 55 secured to the margins of the guide groove by bolts 56 for movement relative to the mounting block to constitute lost motion means. As shown in FIGS. 17 and 18, such retainer plates are of a width greater than the width of the margins of the guide groove so as to form ledges on which the opposite edges of the slide 53 rest.

The plate 50 is suspended by one end from one end of the slide 53. A lug 53' projecting downward from one end of the slide is received between spaced ears 57 upstanding from plate 50. Such lug and ears are apertured to receive a pivot pin 58 so that the lug ears and pivot pin form a clevis. The plate 50 can swing up away from and down toward the web about the axis of pivot pin 58 parallel to the slide.

Figure 15:
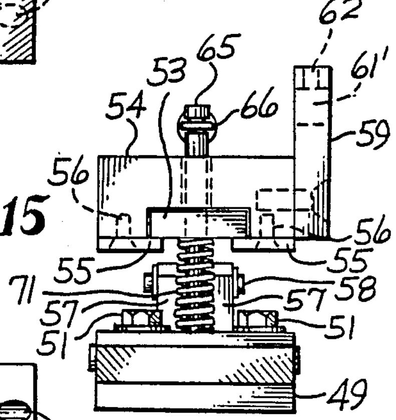
FIG. 15 is an elevation of one end.

The mounting block 54 is mounted on a plate 59 by bolts 60, as shown in FIGS. 13, 14 and 15. Such plate constitutes a spreader plate attached to the lower ends of parallel arms 34 and 34'. Pins 38 and 38' extending through apertures in the lower ends of arms 34 and 34', respectively, are received in apertures 61 and 61' spaced lengthwise of plate 59. Pin 38' is fixed in aperture 61' by a setscrew inserted in hole 62 shown in FIGS. 14 and 18 and shown in broken lines in FIGS. 10, 11, 12 and 19 to 23, inclusive. Preferably, the aperture 61 is elongated to accommodate pin 38 with some tolerance.

Sliding of slide 53 lengthwise of mounting block 54 is limited by a bolt 63 threaded into the upper side of the slide, upstanding from it and received in a slot 64 in mounting block 54 and extending lengthwise of it. The slide normally is urged to the extreme position in which the patch piece transfer member 49 is nearest the shear 28 by a spring 66 connected between the post 63 on slide 53 and a post 65 mounted on the mounting block 54. The force produced by such spring should be adequate to return the slide always to the same extreme position when no force is being applied to transfer member 49, but such spring should not produce a substantial force opposing movement of the slide away from such extreme position.

Swinging of patch piece transfer member 49 relative to slide 53 about the axis of pin 58 in a direction away from the slide is limited by a stop including an upright post 67 having its upper end secured in slide 53 and projecting downward from it through an aperture 68, preferably a slot, in plate 50 at a location spaced lengthwise of such plate from its mounting clevis, and a washer 69 encircling the post and retained in place by a cotter key 70 extending through an aperture in the lower end of the post. The margin of the plate aperture 68 will engage the washer to define the lowermost position of plate 50 and transfer member 49 shown in solid lines in FIG. 13. Swinging of the plate from such lower limiting position upwards toward the slide 53 is resisted by a helical compression spring 71 encircling post 67 and interengaged between the lower surface of slide 53 and the upper side of plate 50.

Figure 16:
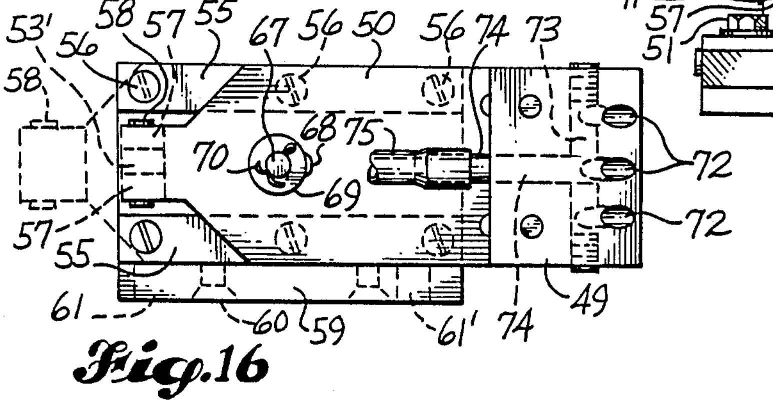
FIG. 16 is a bottom plan.

In order to assist patch piece transfer member 49 in gripping and placing a patch piece, apertures 72 are provided in the bottom of such member, as shown in FIG. 16. Such apertures are in communication with a chamber 73 within the member 49, indicated in FIG. 16, which is connected by a duct 74 to a hose 75. Such hose is connectible alternately to a suction source and to a source of air under pressure.

The process performed by the patch piece transfer mechanism shown in FIGS. 13 to 23 is generally similar to the operation of the patch piece transfer mechanism shown in FIGS. 9 to 12, but with the difference that the mechanism shown in FIGS. 13 to 23 can apply the patch piece more positively, firmly and accurately to the web than is possible with the mechanism shown in FIGS. 9 to 12. While, as discussed above, in the operation of the apparatus shown in FIGS. 9 to 12 the patch piece is blown downward from the patch piece transfer member 36 to the web 29, the apparatus shown in FIGS. 13 to 23 can actually lay the patch piece onto the web as well as applying to the patch piece the force of blowing air. Because of the ability of the transfer member 49 to be moved relative to the mounting block 54 because slide 53 is movable in such mounting block, the transfer member 49 can press the patch piece onto the web for an appreciable period of time without the transfer member skidding on the patch piece or the patch piece skidding on the web, despite the fact that the web may be traveling at a considerable speed.

Figure 19:
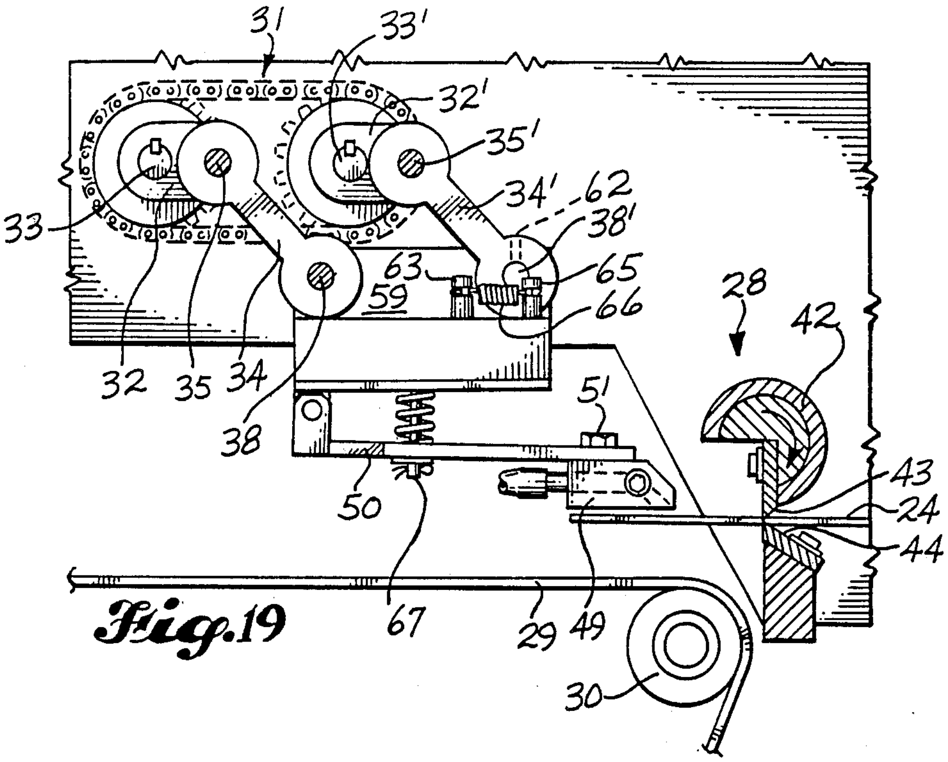
FIGS. 19, 20, 21, 22 and 23 are side elevations similar to FIGS. 10, 11 and 12 of the alternative component shown in FIG. 13 showing such alternative patch piece applying component in different operating positions, respectively.
Figure 20:
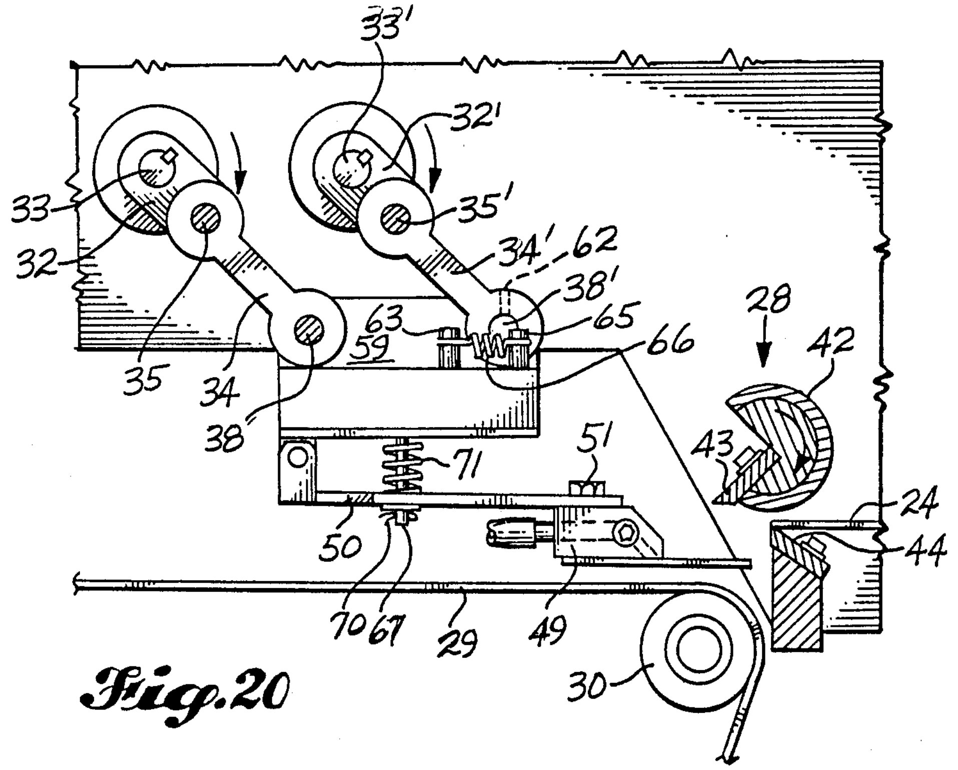

As described above, the transfer member 49 is moved in an orbit by conjoint rotation of the cranks 32 and 32'. While the web will be moved at a constant speed lengthwise, the component of movement of the transfer member 49 parallel to the direction of movement of the web will vary progressively as the transfer member moves around its orbit. When the cranks 32 and 32' extend parallel to the web 29, as shown in FIG. 19, the component of movement of the transfer member in the direction of movement of the web is zero. As the cranks 32 and 32' rotate from their position in FIG. 19 through their positions of FIGS. 20 and 21 to their positions of FIG. 22 perpendicular to the web, the component of speed of the transfer member parallel to the web increases progressively to a maximum. As the cranks 32 and 32' continue to rotate from their upright positions shown in FIG. 22 through their positions shown in FIG. 23 and beyond until the cranks 32 and 32' are again parallel to the web 29 but extending away from the patch piece cutting mechanism 28, the component of the speed of movement of the transfer member 49 parallel to the web 29 decreases progressively to zero. As the cranks 32 and 32' continue to turn from such positions parallel to the web 29 through 180 degrees to their positions shown in FIG. 19 again, the transfer member 49 actually moves in the direction opposite the direction of movement of the web 29.

Figure 22:
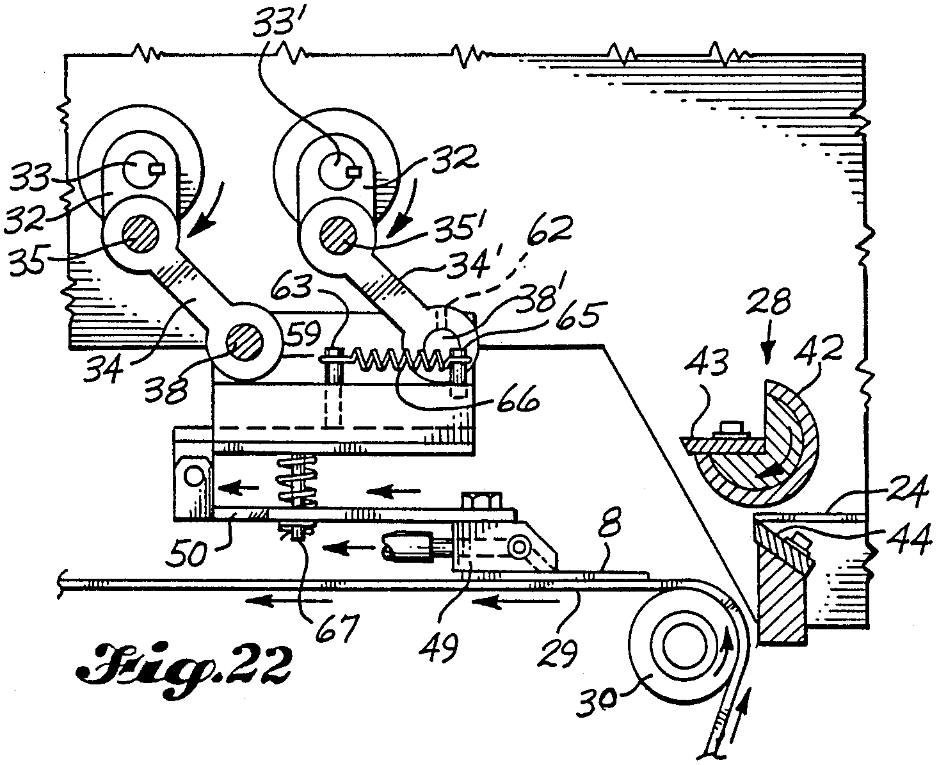

Even if the speed of the component of movement of transfer member 49 were equal to the speed of movement of the web 29 at the instant that the cranks 32 and 32' were perpendicular to the web 29 as shown in FIG. 22, such approximate equality of movement would persist only for an instant both before and after the cranks have reached the position of FIG. 22 perpendicular to the web 29. In order not to require that the web 29 be driven at precisely the same speed as the components of crank movement parallel to the web 29 when the cranks are in the upright position of FIG. 22, the transfer member 49 is arranged to be movable relative to the mounting block 54 by being carried by the slide 53 which is movable relative to such mounting block. Thus the speed of web 29 should be somewhat greater than the maximum speed of the vector of the crank speed parallel to the web even when the cranks 32 and 32' are in their upright positions shown in FIG. 22 perpendicular to the web 29.

Figure 21:
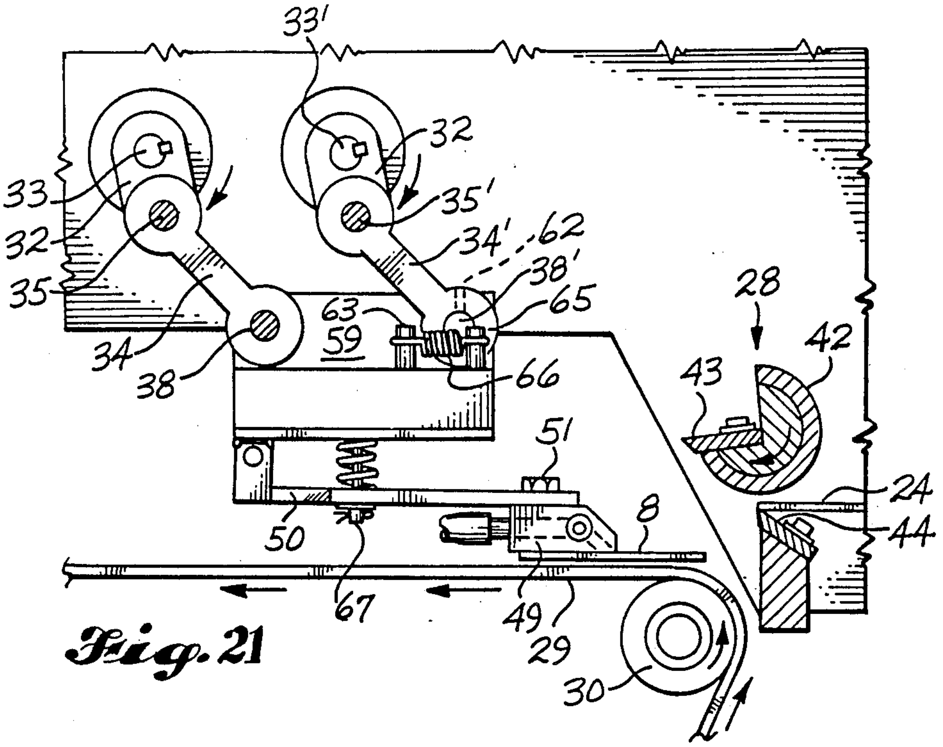
Figure 23:
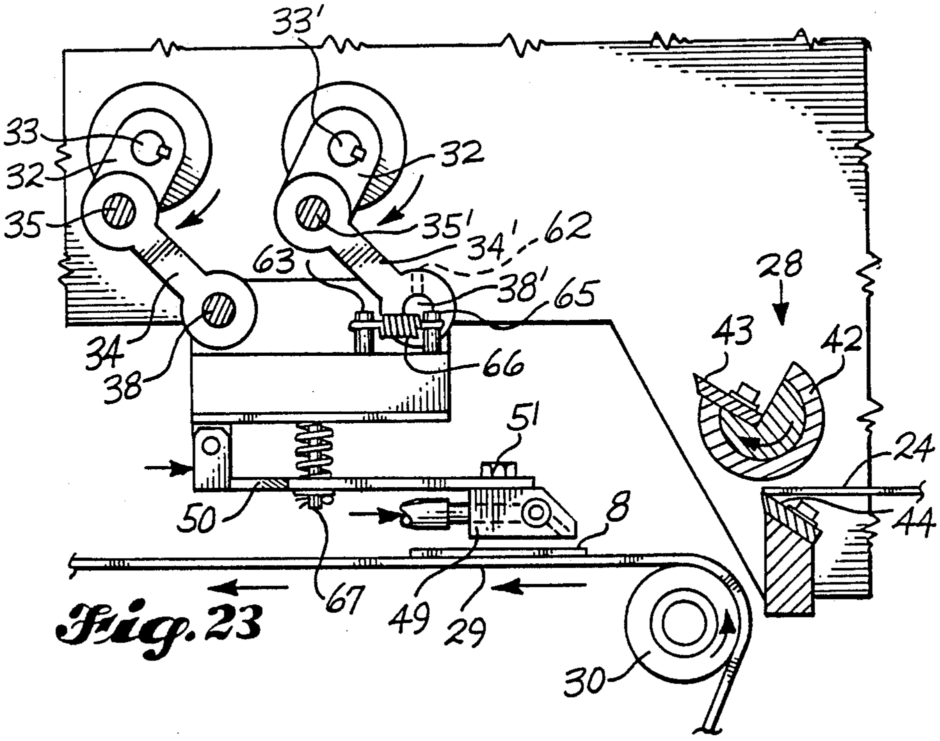

In operation the transfer member 49 lays the patch piece 8 onto the web 29 between the position of the cranks shown in FIG. 21 approaching their positions perpendicular to web 29 and their positions somewhat past the perpendicular position, as shown in FIG. 23. As the transfer member 49 lays the patch piece 8 onto the web 29, as shown in FIG. 22, the suction applied by hose 75 to the apertures 72 in the patch piece transfer member 49 is discontinued and air under slight pressure is supplied by the hose 75 to such apertures to release the patch piece from the transfer member even though the transfer member is still engaged with the patch piece and perhaps to apply some positive pressure supplementing the weight of the transfer member to press the patch piece onto the web. Also, the transfer member is held yieldably in its position farthest from slide 53 by the spiral compression spring 71 as described previously, so that the patch piece is pressed positively by the transfer member onto the web 29 by three actions: first, the weight of the transfer member 49, second, the pressure exerted on plate 50 by spring 71 as the cranks 32 and 32' move from the positions of FIG. 21 to the positions of FIG. 22, and third, the force of the air supplied to the apertures 72.

The patch piece 8 has pressure-sensitive adhesive on its side next to the web 29 which will deter skidding movement of the patch piece relative to the web 29 as the patch piece is laid on the web. Skidding of the patch piece relative to the transfer member 49 after the patch piece is laid on the web is deterred by the frictional contact between the transfer member and the patch piece. As the patch piece is moved by movement of the web 29, therefore, the transfer member 49 will also be moved in the same direction by the web 29, as indicated by the arrow in FIG. 22, which will effect lost motion of the slide 53 relative to the mounting block 54, as shown in FIG. 22, because the web 29 is traveling faster than the maximum component of movement of the cranks 32 and 32' in the direction of travel of the web. Such movement of the slide will be in opposition to the force exerted by spring 66, but this spring force is small.

As soon as the cranks 32 and 32' have been turned from their positions perpendicular to the web 29, as shown in FIG. 22, sufficiently to raise the transfer member 49 out of contact with the patch piece 8, the force of spring 66 will shift the slide and transfer member 49 back to their extreme positions in which the stop post 63 engages one end of slot 64, as shown in FIG. 13. Such return movement of the slide relative to the mounting block is shown in FIG. 23 as having been just completed. Completion of such return movement is evident by comparing the position of the transfer member 49 relative to the mounting block 54 in FIGS. 21 and 23 with the position of the transfer member relative to the mounting block in FIG. 22.

Consequently, even though the web 29 is being moved continuously at a speed greater than the maximum component of the speed of the cranks 32 and 32' parallel to the web 29 when the cranks are perpendicular to such web, as shown in FIG. 22, the transfer member 49 may dwell for an appreciable period of time in position pressing the patch piece 9 against the web 29 as the slide 53 is moved relative to the mounting block 54 by contact of the transfer member with the patch piece pressing such piece against the web 29, as shown in FIG. 22.

I claim:

1. A process for applying a piece to a sheet material web, including moving the web linearly, moving a piece-applying member toward the moving web and thereby applying the piece to the web, and driving the piece-applying member by the moving web resulting from the piece-applying member pressing the piece against the moving web.

2. The process defined in claim 1, including moving the piece-applying member with a motion having one component toward the web and another component in the same direction as the web movement but at a speed slower than the movement of the web prior to the piece-applying member pressing the piece against the web.

* * * * *